(No Model.) 4 Sheets—Sheet 1.
C. R. SABIN.
AUTOMATIC LIQUID MEASURE AND REGISTER.
No. 587,333. Patented Aug. 3, 1897.
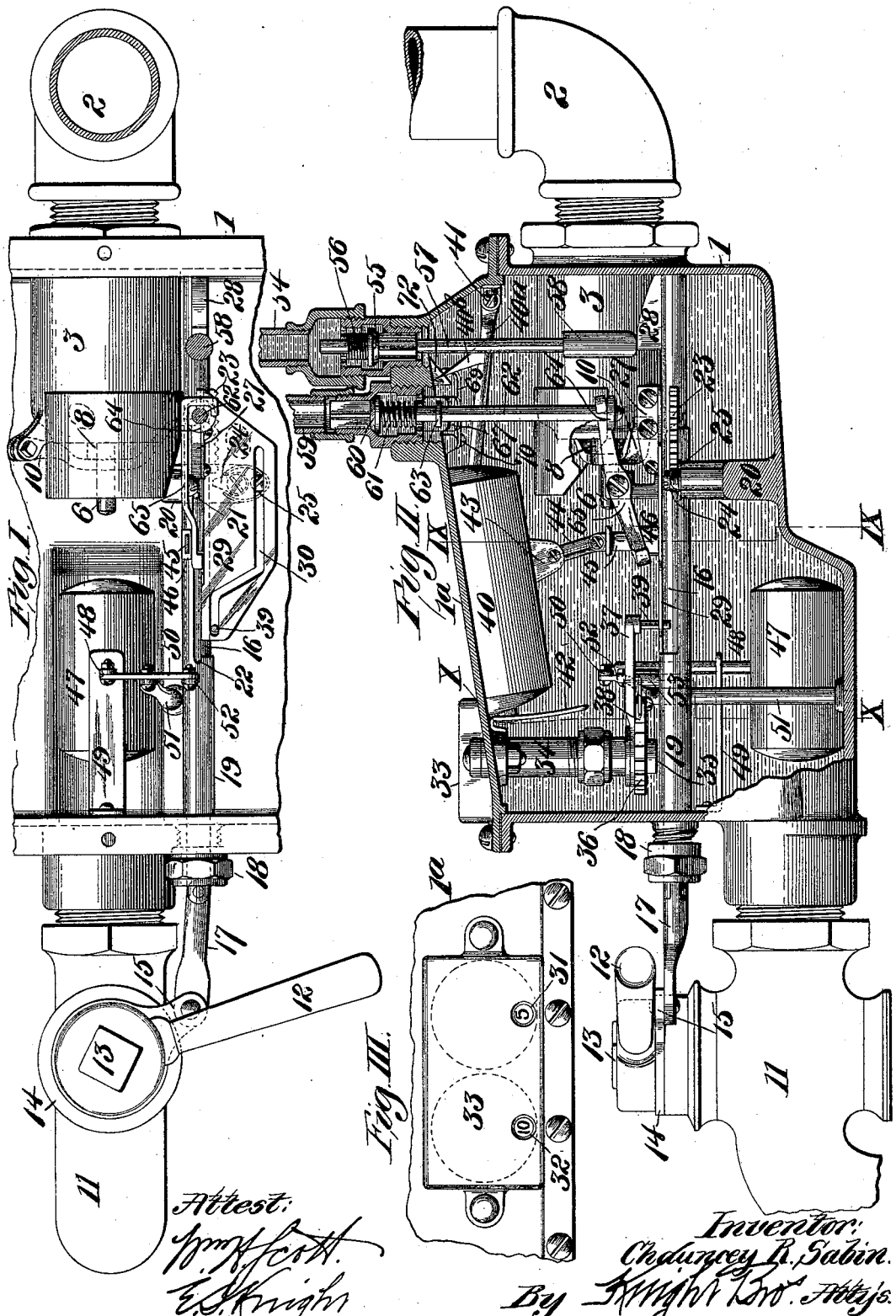
Attest:
Wm. H. Scott
E. S. Knight
Inventor:
Chauncey R. Sabin.
By Knight Bro. Attys.
THE NORRIS PETERS CO., PHOTO-LITHO., WASHINGTON, D. C.

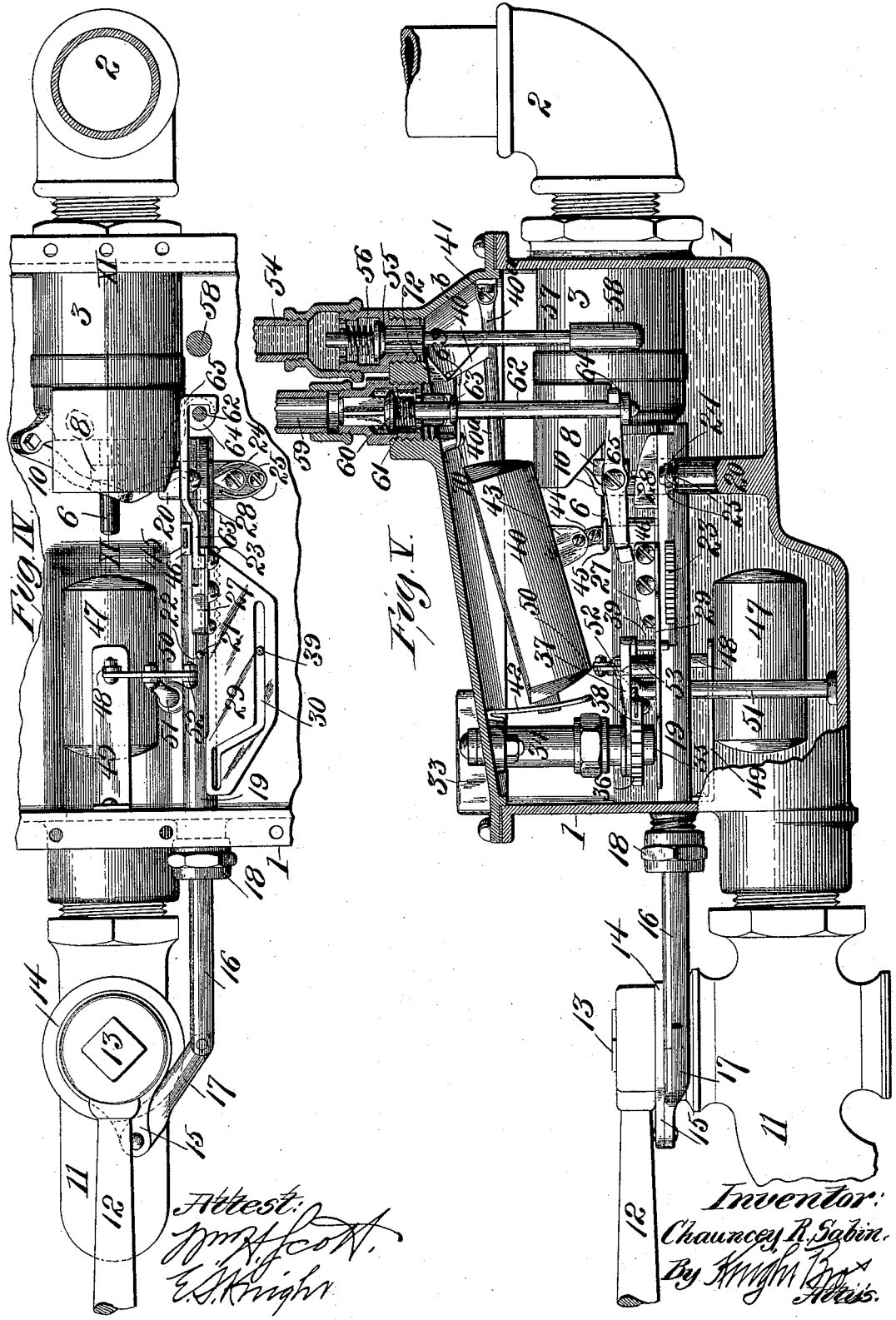

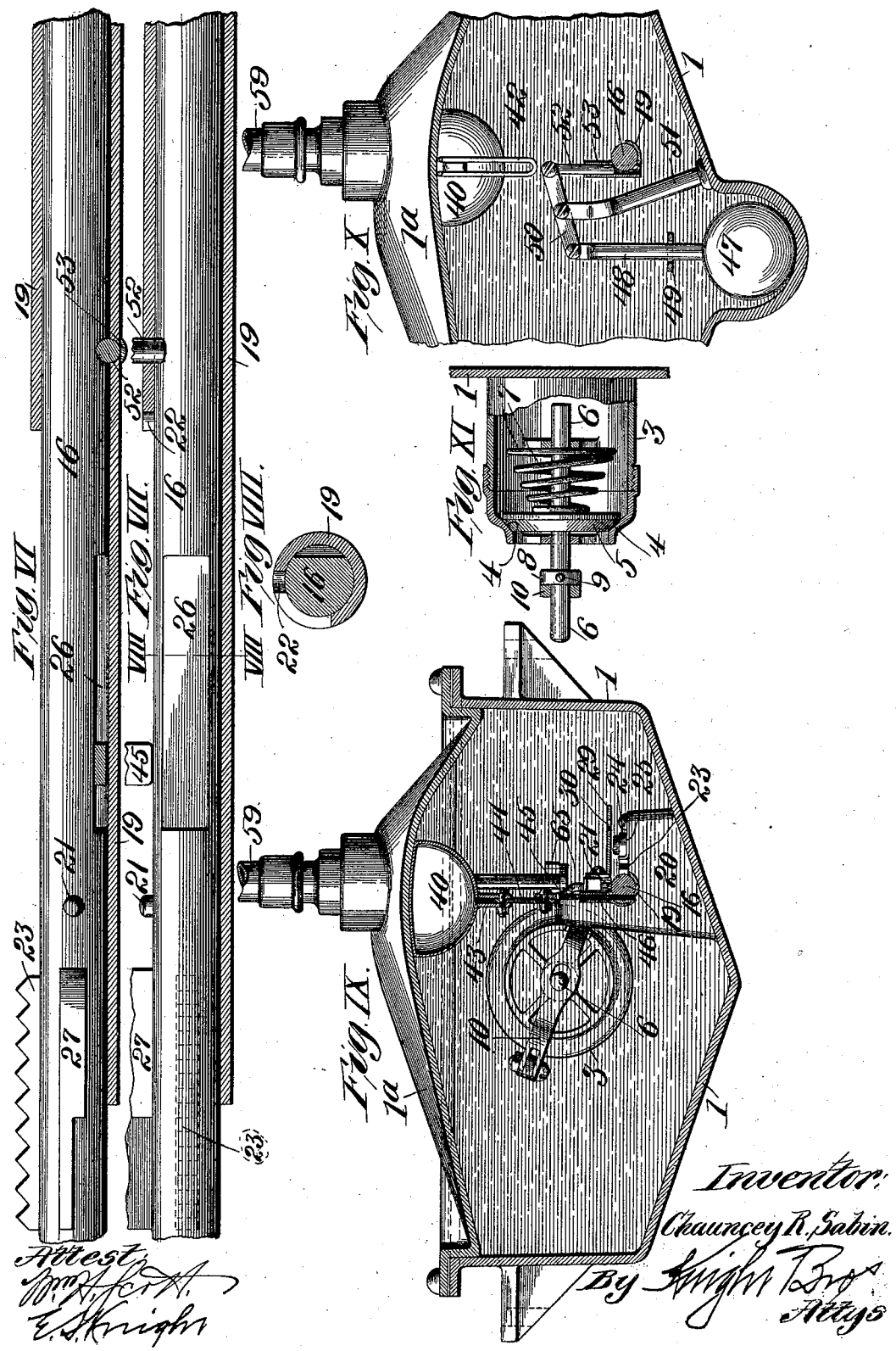

(No Model.) 4 Sheets—Sheet 4.
C. R. SABIN.
AUTOMATIC LIQUID MEASURE AND REGISTER.
No. 587,333. Patented Aug. 3, 1897.
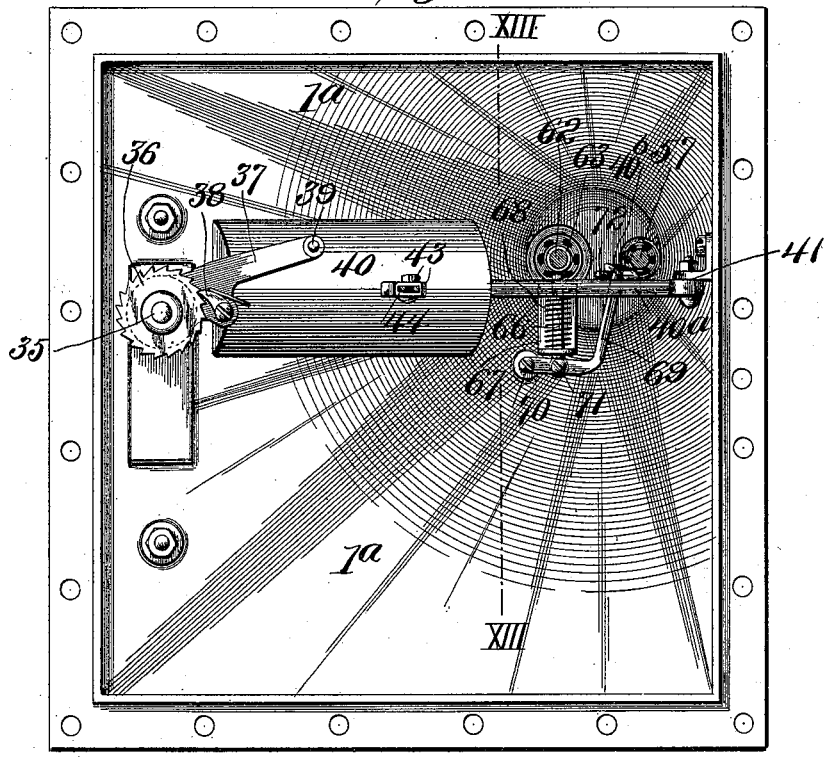
Fig. XII.
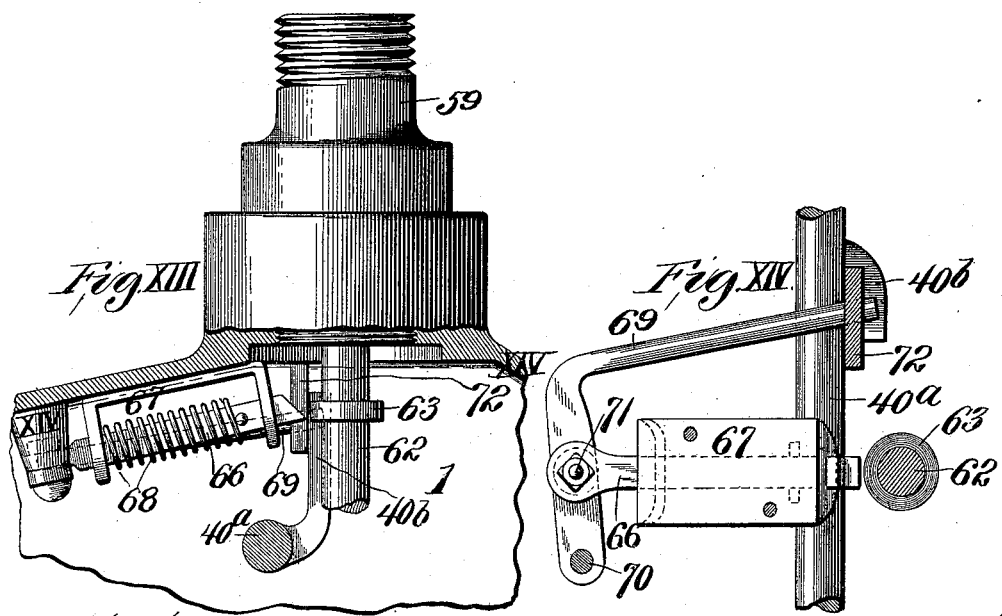
Fig. XIII.  Fig. XIV.
Attest:  
Inventor  
Chauncey R. Sabin.  
By Knight Bro.  
Att'ys

UNITED STATES PATENT OFFICE.

CHAUNCEY R. SABIN, OF ST. LOUIS, MISSOURI.

AUTOMATIC LIQUID MEASURE AND REGISTER.

SPECIFICATION forming part of Letters Patent No. 587,333, dated August 3, 1897.

Application filed May 4, 1896. Serial No. 590,163. (No model.)

*To all whom it may concern:*

Be it known that I, CHAUNCEY R. SABIN, a citizen of the United States, and a resident of the city of St. Louis, in the State of Missouri, have invented a certain new and useful Improvement in an Automatic Liquid Measure and Register, of which the following is a full, clear, and exact description, reference being had to the accompanying drawings, forming a part of this specification.

My invention relates to a measure and register for automatically measuring and registering given quantities of liquids, the device being adapted for attachment to tanks of any description, but more especially intended for application to wagon oil-tanks and other oil-tanks.

The prime object of my invention is to provide a measure and register in the employment of which it is impossible for the dispenser of liquids—such as oil, which is sold from tanks conveyed on wagons—to withdraw any contents from the tank without withdrawing and registering the withdrawal of the full amount of a given quantity, as per the measuring vessel carried by the tank, to the construction of which vessel and its contained mechanism my invention relates.

Referring to the drawings, Figure I is a top view of the central portion of the interior of the measuring vessel, the cap removed, and top view of the discharge-faucet, the parts being in the position assumed while the faucet is closed. Fig. II illustrates a vertical section from front to rear through the device with the faucet closed and the supply-valve open. Fig. III is a top view of the register. Figs. IV and V are respectively similar views to Figs. I and II, showing the parts in the position assumed when the faucet is open and the supply-valve closed. Fig. VI is an enlarged detail top view of the sliding rod carried by the faucet-handle, the sleeve in which it travels being shown in longitudinal section. Fig. VII is an enlarged detail side elevation of the sliding rod with the sleeve shown in longitudinal section. Fig. VIII illustrates a cross-section taken on line VIII VIII, Fig. VII. Fig. IX illustrates a vertical section taken on line IX IX, Fig. III. Fig. X illustrates a vertical section taken on line X X, Fig. II. Fig. XI illustrates a vertical section taken on line XI XI, Fig. IV. Fig. XII is a view of the measuring-vessel cap or cover inverted and showing the portion of mechauism located in the upper part of the vessel. Fig. XIII illustrates a section taken on line XIII XIII, Fig. XII, and shows in side elevation the air-valve catch. Fig. XIV illustrates a section taken on line XIV XIV, Fig. XIII.

In the drawings, 1 designates the measuring vessel, to which leads the supply-pipe 2, connected to the tank from which the liquid is to be withdrawn and measured.

1ª is the cap or cover of the vessel.

On the interior of the vessel 1 and in conjunction with the supply-pipe 2 is a valve-casing 3, provided with a valve-seat 4, against which a valve 5 is adapted to contact. The valve 5 is carried on a rod 6, and bearing against the valve to press it to its seat is a coil-spring 7. The outer end of the valve-rod carries a collar 8, held by a set-screw 9, and 10 is a lever hinged to the valve-casing and loosely fitted to the valve-rod where it bears against the collar 8. The end of the lever 10 opposite its hinge is free and is engaged in the manner hereinafter described to open the supply-valve.

11 designates the discharge-faucet, and 12 its handle, removably attached to the plug-stem 13.

14 is a ring fitted to the plug-stem, from one side of which ring an arm 15 projects.

16 designates a slide-rod connected to the arm 15 by means of a link 17, loosely connected to both arm and slide-rod. The rod 16 passes through a stuffing-box 18 into the measuring vessel and through a sleeve 19, supported by a standard 20. On the upper side of the rod 16 is a stud 21, that in the outward travel of the rod limits its movement by coming in contact with a notch 22 in the sleeve 19, hence forming a preventive against the handle 12 of the faucet being thrown farther than is necessary to open the faucet for the discharge of the measuring vessel when filled.

Carried by the rod 16 at one side is a short rack 23, with which a pawl 24 on the standard 20, controlled by a double spring 25, engages during the first and last of the inner movement of the slide-rod on opening or closing the faucet. The purpose of this is to prevent retrograde movement to close the faucet after the operator has begun to open it or forward movement after he has begun to close the faucet. Hence he is always compelled to complete the movement begun before he can turn the faucet-handle in the opposite direction.

At the side of the rod 16 is a cut-away flat surface 26, and on the upper side of the rod are cams 27 and 28, the purpose of which will hereinafter appear.

29 is a plate secured to the cam 27 and provided with a slot 30, a portion of which runs parallel to the rod 16 and the remainder at an angle to said rod.

31 32 designate the register-dials, inclosed by a casing 33. The dials are operated through means of the following-described mechanism, having connection with the plate 29 through means of the slot 30.

34 designates a sleeve located in the measuring vessel immediately beneath the initial dial 31, in which sleeve a shaft 35, that carries the dial 31, is mounted. On the lower end of the shaft is a ratchet-wheel 36, above which is a rocking lever 37, that carries a spring-actuated pawl 38, whose point engages the teeth of the ratchet-wheel. The outer free end of the rocking lever 37 carries a pin 39, whose office is to move in the slot 30 of the plate 29 to operate the register.

On each outward movement of the rod 16 as the faucet is opened to discharge the contents of the measure the plate 29 is carried forward and the pin 39, traveling in the slot 30, traverses the slot from the location at which it is shown at Figs. I and II to that shown in Figs. IV and V. In such travel the pin in passing through the angle portion of the slot is thrown in a lateral direction, and the lever 37 is rocked with the pin a sufficient distance to cause the spring-actuated pawl 38 to move the ratchet-wheel 36 the distance of one of its teeth and operate the register-dials, thus registering each measureful of liquid as it is withdrawn from the vessel 1.

40 designates a float, through the medium of which and its operated mechanism the opening of the discharge-faucet is prevented during the period occupied in filling the measuring vessel, thereby preventing the operator from withdrawing a quantity at variance with what the measure provides for.

The float 40, by its supporting-rod 40ª, is hinged at 41 to the side of the measuring-vessel cover, and its free end is guided in a loop 42. On the lower side of the float is a lug 43, to which a link 44 is loosely connected. The opposite end of the link is connected to a slide 45, fitting in a vertical sleeve 46 on the side of the sleeve 19. As the liquid flows from the vessel the float falls to the position shown in Fig. V and permits the slide 45 to rest on the rod 16. When the vessel becomes empty and the faucet is closed, the rod 16 moves inward and the slide 45 drops into the cut-away portions 26 of the rod and prevents the outward movement of the rod until the vessel has completely filled and the float been elevated to raise the slide from engagement with the rod. The rod is then free to move, and the faucet may be opened.

47 designates a float, through the medium of which and its operated mechanism the closing of the discharge-faucet is prevented during the period of emptying the measuring vessel, thus preventing the operator from closing off the discharge from the vessel until the full quantity measured has been withdrawn.

The float 47 is carried on a rod 48, that works through a bar 49. The upper end of the rod 48 is connected to one end of a walking-beam 50, pivoted to a post 51, and to the other end of the walking-beam is pivoted a pin 52, fitting in a vertical sleeve 53 on the sleeve 19. This pin 52, when the faucet is closed, bears on the rod 16, and the float 47 is prevented from rising until the faucet being opened the rod is moved to bring the cut-away portion 26 of the rod beneath the pin, when said pin is depressed by the float rising in the liquid by reason of its buoyancy, and the pin, entering the cut-away portion 26, remains therein until the liquid is completely drained from the vessel 1 and the float has fallen by gravity. Therefore it will be seen that until the vessel is drained the discharge-faucet cannot be closed, and the entire contents of the vessel must be withdrawn and the full measure dispensed.

54 designates a pipe leading from the crown of the cover 1ª of the measuring vessel to the supply-tank, from which the liquid is withdrawn. This pipe permits the escape of air from the measuring vessel during the process of filling the vessel. The pipe 54 contains a valve 55, controlled by a spring 56 on a valve-rod 57, that extends down into the measuring vessel and is provided with an enlarged lower end 58, against which, on the inward throw of the sliding rod 16, the cam 28 strikes and raises the valve 55 from its seat. At the same time the cam 27 presses against the lever 10 and said lever opens the supply-valve 5 and admits the liquid to the measuring vessel, the air escaping from the vessel through the pipe 54, as stated.

59 designates an air-pipe for the purpose of admitting air to the measuring vessel during the period of emptying same. This pipe contains a valve 60, controlled by a spring 61, the valve being carried by a valve-rod 62, provided near its upper end with a shoulder 63 and at its lower end with a shoulder 64.

65 designates a rocking lever pivoted intermediate of its ends to the standard 20. One end of this lever is bent at an angle and bears against the upper surface of the shoulder 64, and the opposite end of the lever is arranged to be struck by the cam 27 on the outward throw of the rod 16, and through this means the valve 60 is unseated, and as the faucet is opened the entrance of air through the pipe 59 is permitted, the valve being thus held open until the measuring vessel is empty.

For the purpose of holding the valve 60 unseated until the vessel 1 has become almost filled I provide a catch-and-trip mechanism, which I will now describe.

66 designates a sliding catch-bar supported in a keeper 67 and controlled by a spring 68. When the valve 60 has been unseated by the outward throw of the rod 16, the point of the catch-bar 66 engages the shoulder 63 on its upper side and holds the valve-rod 62 down until the catch is released on the upward movement of the float 40, as will presently be explained.

69 designates a rocking lever pivoted at 70 to the cover $1^a$ and provided at 71 with pivotal connection to the catch-bar 66. The opposite end of the rocking lever 69 is free and is adapted to be engaged by a finger $40^b$ on the float-rod $40^a$ and is prevented from upward movement by an inclined lug 72. As the float 40 falls the lever 69 is allowed to move and the catch-bar 66 is permitted to be thrown by the spring 68 into engagement with the shoulder 63 on the valve-rod 62, where it remains until the float 40 in rising causes the finger $40^b$ to strike the rocking lever again and withdraw the catch-bar from engagement with the shoulder 63 to permit the valve 60 to seat.

It will be understood that on the outward movement of the slide-rod 16 in opening the discharge-faucet the valve 55 is caused to immediately close as soon as the cam 28 has passed from beneath the valve-rod 57, the closure of the valve being caused by the action of the spring 56. This closing of the valve 55 takes place before the passage through the discharge-faucet has begun to open, and the result is that any liquid in the pipe 54 is prevented from flowing into the measuring vessel after the liquid has begun to flow therefrom. Thus the accuracy of the amount measured is not disturbed by liquid flowing from the pipe 54 into the measuring vessel after it has begun to empty. It will also be understood that the valve 60 closes the air-pipe 59 a sufficient period before the completion of the act of filling the measuring vessel to avoid any liquid entering the air-pipe before the closure of said valve, as should liquid enter this pipe before the closure of the valve it would on the opening of the valve return to the measuring vessel and destroy the accuracy of the quantity of liquid measured.

I claim as my invention—

1. In an automatic measure, the combination of a vessel, a discharge faucet or valve, a slide-rod connected to the means for opening and closing said faucet or valve and extending into said vessel, means for preventing the movement of said slide-rod until the vessel has become filled with liquid, and means for preventing the movement of said slide-rod after the faucet or valve has been opened until the contents of the vessel has been withdrawn, substantially as described.

2. In an automatic measure, the combination of a vessel, a discharge faucet or valve, a slide-rod connected to the means for opening and closing said faucet or valve and extending into said vessel, a float-carried slide arranged to engage said slide-rod while the vessel is filling, and a float-carried slide arranged to engage said slide-rod while the vessel is emptying, substantially as described.

3. In an automatic measure, the combination of a vessel, a discharge faucet or valve, a slide-rod connected to the means for opening and closing said faucet or valve, and extending into said vessel, said slide-rod being provided at its side with a cut-away portion, a float-carried slide arranged to engage in said cut-away portion while said vessel is filling, and a float-carried slide arranged to enter said cut-away portion while the vessel is emptying, substantially as described.

4. In an automatic measure, the combination of a vessel, a discharge faucet or valve, an operating-handle, a slide-rod connected to the stem of said valve, and extending into said vessel, said slide-rod having at its side a cut-away portion, a float-carried slide arranged to engage in said cut-away portion while said vessel is filling, and a float-carried slide arranged to engage in said cut-away portion, while said vessel is emptying, substantially as described.

5. In an automatic measure, the combination of a vessel, a means of supply, a discharge faucet or valve, a sliding rod connected to the stem of said valve and extending into said vessel, an automatically-closing supply-valve controlling the entrance to said vessel from said means of supply, a lever arranged to press said supply-valve from its seat, a cam on said slide-rod arranged to engage said lever, a rack carried by said slide-rod, and a pawl arranged to engage said rack to prevent retrograde movement of said slide-rod; substantially as described.

6. In an automatic measure, the combination of a vessel, a supply-tank, a discharge faucet or valve, a slide-rod connected to the stem of said valve and extending into said vessel, a pipe leading from said vessel to the supply-tank, an automatically-closing valve in said pipe, a valve-rod on which said valve is carried, a cam on said rod through means of which said valve is unseated, a rack carried by said slide-rod, and a pawl arranged to engage said rack to prevent retrograde movement of said slide-rod, substantially as described.

7. In an automatic measure, the combination of a vessel, a discharge faucet or valve, a slide-rod connected to the stem of said valve and extending into said vessel, a pipe for the purpose of conveying air into said vessel, a spring-closing valve in said pipe, a valve-rod by which said valve is carried, a rocking lever arranged to engage said valve-rod, and a cam carried by said valve-rod arranged to move said rocking lever for the purpose of unseating said air-pipe valve, substantially as described.

8. In an automatic measure, the combination of a vessel, a means of supply, a discharge faucet or valve, a pipe for the purpose of conveying air to said vessel, a spring-closing valve located in said air-pipe, a valve-rod by which said valve is carried, a spring-actuated catch-bar adapted to engage said valve-rod, and means for disengaging said catch-bar from said valve-rod, substantially as described.

9. In an automatic measure, the combination of a vessel, a means of supply, a discharge faucet or valve, a pipe for the purpose of conveying air to said vessel, a spring-closing valve located in said air-pipe, a valve-rod by which said valve is carried, a spring-actuated catch-bar adapted to engage said valve-rod, a rocking lever adapted to retract said catch-bar, a float, and a finger carried by said float, said finger being arranged to rock said rocking lever on the rising of the said float, substantially as described.

10. In an automatic measure, the combination of a vessel, a discharge-faucet, a means for opening and closing said faucet, mechanism arranged to lock said means from movement, and a detention mechanism arranged to engage said lock mechanism, whereby said lock mechanism is prevented from retrograde movement after its initial start in either direction, substantially as described.

11. The combination of an auxiliary vessel having a pipe connection with a supply-tank, of a valve arranged in said pipe, mechanism for moving said valve, and mechanism for locking said valve-moving mechanism when said valve is closed, whereby said valve is held closed until all of the liquid is drained from said auxiliary vessel, substantially as set forth.

In testimony whereof I have affixed my signature this 10th day of April, 1896.

CHAUNCEY R. SABIN.

In presence of—
  E. S. KNIGHT,
  N. FINLEY.